Nov. 28, 1950     J. M. MYERS     2,531,582
GEAR SHIFTER CONTROL
Filed Dec. 10, 1948     2 Sheets—Sheet 1
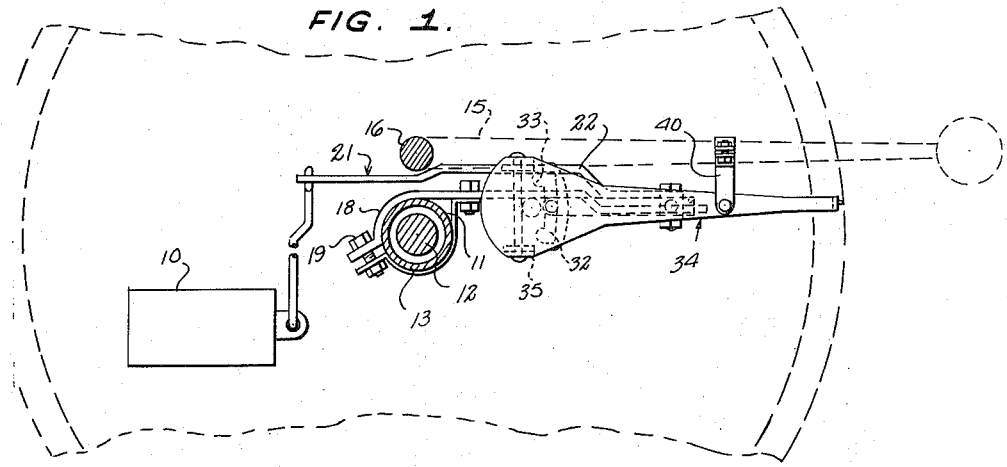
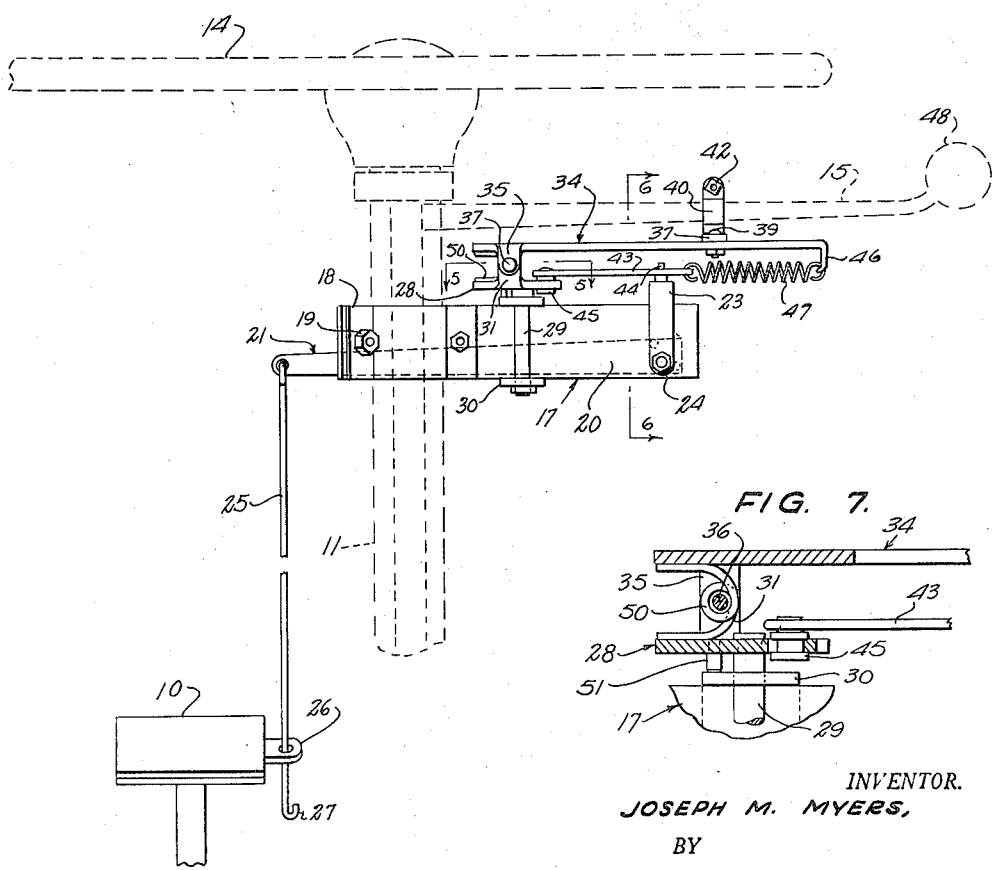
INVENTOR.
JOSEPH M. MYERS,
BY
McMorrow, Berman & Davidson
ATTORNEYS.

Nov. 28, 1950  J. M. MYERS  2,531,582
GEAR SHIFTER CONTROL
Filed Dec. 10, 1948  2 Sheets-Sheet 2

INVENTOR.
JOSEPH M. MYERS,
BY
McMorrow, Berman + Davidson
ATTORNEYS.

Patented Nov. 28, 1950

2,531,582

UNITED STATES PATENT OFFICE 2,531,582

GEAR SHIFTER CONTROL

Joseph M. Myers, Austin, Tex.

Application December 10, 1948, Serial No. 64,670

3 Claims. (Cl. 192—3.5)

This invention relates to gear shifters and more particularly to an improved gear shifter mountable on an automotive vehicle steering column for connection between the vehicle clutch pedal and gear shift lever for shifting the vehicle transmission gears by operation of the clutch pedal.

It is among the objects of the invention to provide an improved gear shifting mechanism which can be mounted on a vehicle steering column and connected to the vehicle clutch pedal and gear shift lever without any modification of the vehicle structure and without materially affecting the normal operation of the gear shift lever or the clutch pedal, to automatically shift the vehicle transmission gears upon operation of the clutch pedal, which is effective to automatically move the gear shift lever from its first or low speed position to its second speed position and between its second and third or high speed positions upon successive depressions of the clutch pedal and to move the gear shift lever from any one of its speed ratio positions into its neutral position, and which is simple and durable in construction, of small size and light weight, easy to install and operate, and of neat and attractive appearance.

Other objects and advantages will become apparent from a consideration of the following description and the appended claims in conjunction with the accompanying drawings, wherein:

Figure 1 is a top plan view of a gear shifter illustrative of the invention with associated parts of an automotive vehicle diagrammatically illustrated, the steering column and gear shift lever being shown in transverse cross-section;

Figure 2 is a side elevation of the gear shifter and associated automotive vehicle parts illustrated in Figure 1;

Figure 7 is a longitudinal cross-section of a fragmentary portion of the mechanism taken on the line 7—7 of Figure 5.

Figure 3:
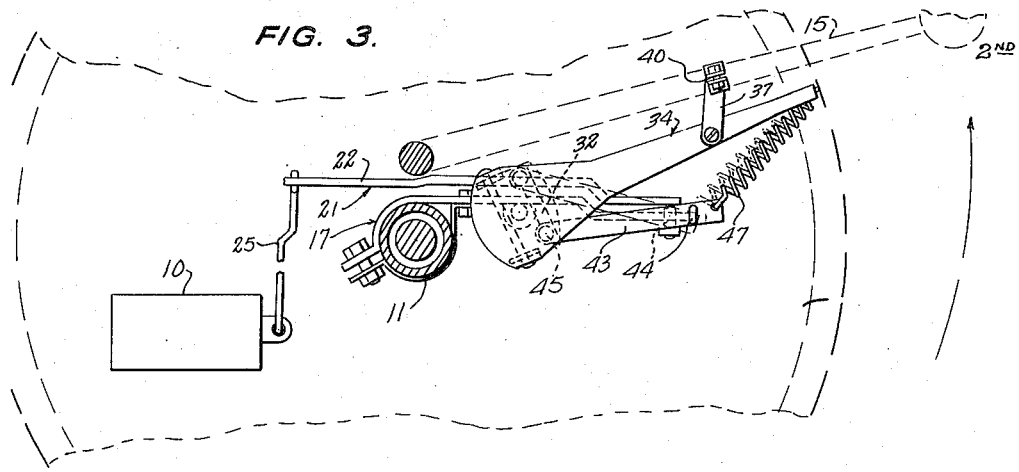
Figure 3 is a top plan similar to Figure 1 showing the parts in a different operative position from that illustrated in Figure 1.

With continued reference to the drawings, wherein the improved gear shift is illustrated as operatively applied to the associated components of a conventional automotive vehicle, such as an automobile or truck having a gear shift lever supported by the steering column adjacent the steering wheel, the numeral 10 indicates the conventional clutch pedal of the vehicle, the numeral 11 the vehicle column comprising the steering shaft 12 and the housing 13, the steering wheel 14 secured to the steering shaft 12 at the upper end of the tubular housing 13 and the gear shift lever 15 supported on the steering column 11 adjacent the steering wheel 14 for pivotal or swinging movements and means including a rod or shaft 16 connecting the gear shift lever to the transmission mechanism of the vehicle.

In one operative range of movement the gear shift lever 15 is pivotally movable back and forth between first or low gear and the reverse gear of a transmission and in a second or lower range of movement it is pivotally movable back and forth between the second and third or high gear ratios of the transmission. In passing from any gear ratio position to another gear ratio position the lever passes through its neutral position. It is contemplated that the gear shift lever will be manually controlled for low gear and reverse gear operation and that the shifting mechanism will automatically control the operation of the gear shift lever from low gear to second gear and then between second gear ratio and the high gear ratio or direct drive of the transmission and from any of these positions to its neutral position by operation of the clutch pedal. Such operation of the gear shift lever will obviously be of material advantage under certain driving conditions as when driving in heavy traffic or over a substantially level area where it is seldom necessary to use the low gear ratio of the transmission but is necessary to frequently change between second gear ratio and direct drive operation. With the improved gear shifter of the present invention, when a vehicle operating in high gear is slowed down in traffic full depression of the clutch pedal will shift the gears from direct drive to second gear ratio and, as soon as the vehicle has gained sufficient speed, a subsequent full depression of the clutch pedal will shift the transmission from second speed ratio back to direct drive, the transmission being shifted back and forth between its second speed and direct drive ratios by successive operation of the clutch pedal. A partial, approximately one-half, depression of the clutch pedal will shift the transmission from the speed ratio in which it is operating into neutral.

The gear shifting mechanism comprises a bracket, generally indicated at 17, having at one end a split band 18 the ends of which are provided with apertured ears secured together by suitable bolts 19 for firmly clamping the bracket onto the steering column 11 adjacent the steering wheel 14 and immediately below the gear shift lever 15. This bracket has a leg 20 projecting outwardly from the steering column substantially perpendicular to the latter and positioned below and substantially parallel to the gear shift lever 15 when the gear shift lever is in its neutral position. An arm, generally indicated at 21, in the form of a bell-crank lever having a long leg 22 and a short leg 23 is pivotally connected at its knee to the leg 20 of bracket 17 near the outer end of the latter by a pivot bolt 24. The end of the longer leg 22 remote from the pivot bolt 24 overhangs the clutch pedal 10 and is provided with an aperture which receives the upper end of a tension link 25 the lower end of which extends through an aperture in a lug 26 secured to the clutch pedal 10 and is provided with a re-curved portion or eye 27 engageable with the lug so that when the clutch pedal is depressed the tension link will pull the end of the arm 21 to which the link is connected downwardly about the axis of the pivotal connection between this arm and the bracket 17. Preferably but not necessarily the shorter leg 23 of arm 21 is doubled to provide a U-shaped member having two legs between which the outer end portion of the leg 20 of bracket 17 is received to provide a more rigid connection between the arm 21 and the bracket 17.

A plate, generally indicated at 28, is pivotally mounted on the bracket 17 by suitable means such as the pivot bolt 29 secured at its upper end to the plate 28 substantially centrally of the latter and extending to the apertured ends of a C-shaped clip 30 with the leg 20 of the bracket disposed between the bight of the clip and the bolt 29. The bolt 29 extends transversely of the bracket leg 20 and the plate 28 is disposed above the bracket and substantially perpendicular to the upper edge of the leg 20 for rotational movement about an axis transverse to the bracket leg and substantially parallel to the axis of swinging or pivotal movement of the gear shift lever 15. The plate 28 is provided with a pair of upstanding, apertured ears 31 disposed one at each end of the plate and has an elongated slot 32 extending longitudinally thereof between locations respectively adjacent the oppositely disposed ears 31. At each end the slot 32 is provided with a rounded recess 33 extending toward the adjacent ear 31, the slot being operatively disposed between the ears 31 and the outer end of the bracket leg 20 and extending transversely across the upper edge of the bracket leg generally perpendicular to the latter.

A flat lever, generally indicated at 34, is provided, adjacent one end thereof, with a pair of oppositely disposed apertured ears 35 which overlie the ears 31 of plate 28 and are pivotally connected to the ears of the plate by a pivot pin 36 extending through the apertures of the overlapping ears so that the lever 34 is pivotally movable relative to the plate 28 about an axis which is disposed substantially perpendicular to the axis of rotational movements of the plate and substantially perpendicular to the upper edge of the bracket leg 20 when the gear shift is in neutral position.

A torsion spring 50 surrounds pin 36 and bears at one end on plate 28 and at its other end on lever 34 at the end of the lever adjacent the steering column to resiliently urge the outer end of lever 34 downwardly. A bearing pin 51 extending from plate 28 and riding upon the bight of clip 30 transmits the reaction of this spring to bracket 17.

A link 37 is pivotally connected at one end to the lever 34 near the outer end of the latter by a pivot screw or rivet 39 and is connected at its opposite end to a split clamp 40 by a suitable screw or rivet 41 extending through an aperture in the link near the outer end of the latter. The clip 40 surrounds the gear shift lever 15 intermediate the length of the latter and is provided with a pair of opposed apertured ears through which a screw 42 extends to clamp the clip about the gear shift lever. By this means the arm is operatively connected to the gear shift lever to move the gear shift lever upon swinging or pivotal movement of the arm about the axis of the pivot bolt 29 by which the plate 28 is attached to the bracket 17.

A toggle link 43 is provided near one end with an aperture which pivotally receives a pin 44 secured to and upstanding from the end of the shorter leg 23 of the arm 21. Near its opposite end the toggle link is provided with a downwardly projecting pin 45 which is slidably received in the slot 32 of the plate 28. At its outer end lever 34 is provided with a downwardly extending ear 46 and a tension spring 47 is connected between the lower end of the ear 46 and the adjacent end of toggle link 43.

Figure 4:
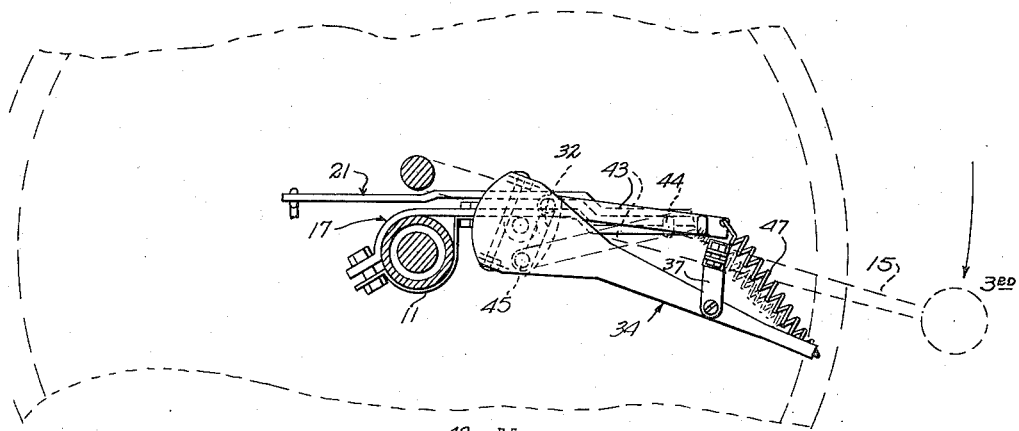
Figure 4 is a view similar to Figures 1 and 3 showing the parts in a still different operative position from that illustrated in Figures 1 and 3.
Figure 5:
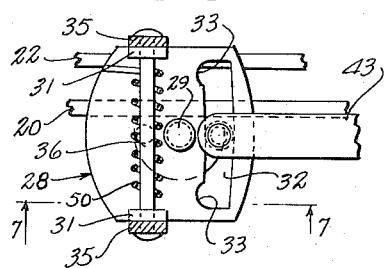
Figure 5 is a longitudinal cross-section taken substantially on the line 5—5 of Figure 2.
Figure 6:
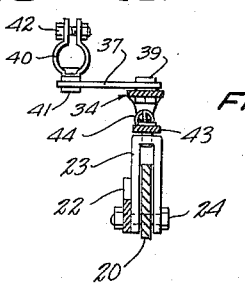
Figure 6 is a transverse cross-section taken substantially on the line 6—6 of Figure 2.

With the above described arrangement and assuming that the gear shift lever 15 has been brought to its low speed position by manual movement of the shift knob 48, the parts will be in the position illustrated in Figure 4 with the pin 45 in the end of slot 32 adjacent the gear shift lever, that is, at the end of the slot toward which the gear shift lever must be moved to change from low to second speed gear ratio. If now the clutch pedal 10 is depressed tension link 25 will exert a downward pull on the free end of the longer leg of arm 21 and the pin 44 connected to the free end of the short leg of the arm will force the toggle link 43 in a direction toward the steering column 11 thereby forcing the plate 28 to pivot about the axis of pivot bolt 29 in a counter-clockwise direction, as illustrated in Figure 3, swinging the lever 34 in a counter-clockwise direction also about the pivotal axis of bolt 29 and moving the gear shift lever from its low speed to its neutral position, at which spring 50 pulls the lever down into the lower plane, and then into the second speed position, as illustrated in Figure 3. If it is desired to return to low speed this must be accomplished manually. With the gear shift lever in its second speed position, accomplished either manually or through operation of the automatic shifting mechanism as explained above, the parts will be in the position illustrated in Figure 3 with the pin 45 in the end of slot 32 remote from the gear shift lever, that is, at the end of the slot toward which the gear shift lever must be moved to change from second to third speed ratio. If now the clutch pedal 10 be again depressed, tension link 25 will exert a downward pull on the free end of the longer leg of arm 21 and the pin 44 will force the toggle link 43 in a direction toward the steering column 11 thereby forcing plate 28 to turn in a clockwise direction about the pivotal axis of bolt 29 and move the gear shift lever from its second speed position as illustrated in Figure 3 to its high speed position as shown in Figure 4 which is the same as its low speed position except in a plane below the low speed position. This causes the toggle link 43 to pivot about the pin 44 swinging the end of the toggle link to which the spring 47 is attached in a direction to tension the spring. As soon as the pressure on the clutch pedal is released and the free end of leg 22 of arm 21 rises the spring 47 will contract swinging the toggle link about the pin 44 until pin 45 is in the opposite end of slot 32, that is the end nearest the gear shift lever, as illustrated in Figure 4. If now the clutch pedal be again depressed, the pivotal movement of arm 21 about the pivot bolt 24 will force the toggle link 42 in a direction toward the steering column 11, but, as the pin 45 is now in the opposite end of the slot 32 from the position illustrated in Figure 3 the plate 29 and lever 34 will be forced to swing in a counter-clockwise direction moving the gear shift lever 15 from its third speed position, as illustrated in Figure 4, back to its second speed position, as illustrated in Figure 3. Pivoting of the toggle link 43 about the axis of pin 44 will again tension spring 47 and as soon as the pressure on clutch pedal 10 is released and the free end of leg 22 of arm 21 permitted to rise the spring will swing the toggle link about pin 44 to return pin 45 to the end of slot 32 remote from the gear shift lever, as illustrated in Figure 3, so that upon the next depression of clutch pedal 10 a clockwise movement will again be imparted to the lever 34 and gear shift lever 15.

When the gear shift lever is in its neutral position the pin 45 is displaced from the center toward one end of slot 32 by the connection of spring 47 to the end of toggle link 43 at a location to one side of a line passing through the axis of pins 44 and 45 so that as soon as the shorter leg 23 of arm 21 starts to move the toggle link inwardly in a direction toward the steering column the toggle link is swung above the axis of pin 44 an amount sufficient to permit pin 45 to slide through the slot 32 toward that end of the slot in which it will move the gear lever to second speed position. The gear shift lever will thus always be shifted from neutral to second speed position upon full depression of the clutch pedal when it has been left in neutral and in the absence of manual control of the gear shift lever. This displacement of pin 45 in slot 32 also precludes blocking movement of the clutch pedal when the shifter is in neutral position. The clutch is set so that the clutch will be fully released during the first part of the downward movement of the clutch pedal and this lost motion of the toggle link 43 is sufficient to permit disengagement of the clutch without shifting the transmission gears of the vehicle.

If depression of the clutch is continued to an intermediate position the gear shift lever will be brought to its neutral position and if continued to its bottom position. of course, the gear shift lever 15 will be moved to place the transmission in the alternative gear drive position. The off-center position of the connection between the spring 47 and toggle link 43 is not sufficient to interfere with the normal operation of the toggle link in positioning the pin 45 at the opposite ends of the slot 32, as explained above.

The various parts of the gear shifter are simple in construction and of small size and may be given an attractive finish as by painting or metal plating the parts with a bright metal so that the device is inconspicuous and attractive in appearance. Because of its small size and location beneath the stearing wheel of the vehicle, the gear shifting device does not interfere in any way with normal operation of the vehicle and it is apparent that no modification of the vehicle structure is required to operatively install the gear shifting device on the vehicle.

The invention may be embodied in other specific forms without departing from the spirit or essential characteristics thereof. The present embodiment is, therefore, to be considered in all respects as illustrative and not restrictive the scope of the invention being indicated by the appended claims rather than by the foregoing description, and all changes which come within the meaning and range of equivalency of the claims are, therefore, intended to be embraced therein.

What I claim is:

1. Gear shifting mechanism for a motor vehicle having a clutch pedal, a steering wheel column and a gear shift lever supported by said column comprising a bracket secured to said column adjacent said gear shift lever, an arm pivoted near one end to said bracket, means connecting said one end of said arm to said gear shift lever for successively moving said lever in opposite directions upon successive pivotal movements of said arm, and means connecting the opposite end of said arm to said clutch pedal for movement of said arm by depression of said clutch pedal, said means connecting said arm to the gear shift lever comprising a lever pivotally mounted at one end on said bracket, means connecting said lever near its opposite end to the gear shift lever, and means interconnecting said arm and said pivoted lever operative to move said lever in the direction away from its immediate position upon pivotal movement of said arm.

2. Gear shifting mechanism for a motor vehicle having a clutch pedal, a steering wheel column and a gear shift lever supported by said column comprising a bracket secured to said column adjacent said gear shift lever, an arm pivoted near one end to said bracket, means connecting said one end of said arm to said gear shift lever for successively moving said lever in opposite directions upon successive pivotal movements of said arm, and means connecting the opposite end of said arm to said clutch pedal for movement of said arm by depression of said clutch pedal, said arm comprising a bell-crank lever pivotally connected at its knee to said bracket, and said means connecting said arm to the gear shift lever comprising a plate pivotally mounted on said bracket for rotational movements about an axis transverse to said bracket and having an elongated slot therein, a lever pivotally connected at one end to said plate for movement about an axis perpendicular to the axis of movement of said plate, means connecting said lever near its free end to the gear shift lever, a toggle link pivotally connected at one end to the end of said arm opposite the end of the latter connected to said clutch pedal, said toggle link overlying the slot in said plate, a pin secured to said toggle link and slidably received in said slot, and spring means interconnecting the end of said link connected to said arm to the end of said lever connected to said gear shift lever to move said link carried pin from one end to the other end of said slot when said lever is moved from one to the other of its two operative positions.

3. Gear shifting mechanism for a motor vehicle having a clutch pedal, a steering wheel column and a gear shift lever supported by said column comprising a bracket secured to said column adjacent said gear shift lever, an arm pivoted near one end to said bracket, means connecting said one end of said arm to said gear shift lever for successively moving said lever in opposite directions upon successive pivotal movements of said arm, and means connecting the opposite end of said arm to said clutch pedal for movement of said arm by depression of said clutch pedal, said arm comprising a bell-crank lever pivotally mounted at its knee on said bracket, and said means connecting said arm to said gear shift lever comprising a slotted plate mounted on said bracket for rotational movements about an axis spaced from and substantially at right angles to the axis of the pivotal connection between said arm and said bracket, a lever pivotally connected at one end to said plate for pivotal movements about an axis substantially at right angles to the axis of rotational movements of said plate relative to said bracket, means connecting said lever to the gear shift lever, and means connected to said arm and engageable in the slot of said plate for moving said lever in consecutively opposite directions upon successive movements of said arm.

JOSEPH M. MYERS.

REFERENCES CITED

The following references are of record in the file of this patent:

UNITED STATES PATENTS

| Number | Name | Date |
|---|---|---|
| 154,580 | Campbell | July 14, 1925 |
| 1,586,003 | Noble | May 25, 1926 |
| 1,608,992 | Peavy | Nov. 30, 1926 |

FOREIGN PATENTS

| Number | Country | Date |
|---|---|---|
| 585,728 | France | Dec. 13, 1924 |
| 886,718 | France | Oct. 22, 1943 |